United States Patent [19]
Detwiler et al.

[11] Patent Number: 5,931,269
[45] Date of Patent: Aug. 3, 1999

[54] AIRCRAFT WHEEL PART WITH CORROSION AND WEAR RESISTANCE

[75] Inventors: Michael R. Detwiler, Niles, Mich.; Frederick D. McGuire, Jr., South Bend, Ind.

[73] Assignee: AlliedSignal Inc., Morristown, N.J.

[21] Appl. No.: 08/843,822

[22] Filed: Apr. 21, 1997

[51] Int. Cl.⁶ .................................................. F16F 9/00
[52] U.S. Cl. ........................ 188/382; 301/6.2; 427/305; 188/18 A
[58] Field of Search ................................. 301/6.2, 6.91, 301/6.1; 188/218 R, 71.5, 218 XL, 18 R, 18 A, 382, 251 A, 251 R, 251 M; 76/DIG. 11; 148/218, 254, 286, 905; 420/122, 119; 427/419.7, 405, 304, 305, 438; 175/374, 375; 428/679; 192/107 M; 219/121.59

[56] References Cited

U.S. PATENT DOCUMENTS

| | | | |
|---|---|---|---|
| 3,958,833 | 5/1976 | Stanton | 301/6.2 |
| 4,017,123 | 4/1977 | Horner et al. | 301/6.2 |
| 4,084,857 | 4/1978 | VanderVeen | 301/6.2 |
| 4,358,922 | 11/1982 | Feldstein | 427/419.7 |
| 4,383,594 | 5/1983 | Correll et al. | 188/71.5 |
| 4,593,776 | 6/1986 | Salesky et al. | 76/DIG. 11 |
| 4,683,781 | 8/1987 | Kar et al. | 76/DIG. 11 |
| 4,856,619 | 8/1989 | Petersen | 188/18 A |
| 4,907,665 | 3/1990 | Kar et al. | 76/DIG. 11 |
| 4,990,372 | 2/1991 | Sunder et al. | 427/419.7 |
| 5,186,521 | 2/1993 | Niespodziany et al. | 188/71.5 |
| 5,236,249 | 8/1993 | Han et al. | 301/6.1 |
| 5,273,140 | 12/1993 | Berwanger | 188/218 XL |
| 5,310,025 | 5/1994 | Anderson | 192/70.17 |
| 5,409,762 | 4/1995 | Ozaki et al. | 428/216 |
| 5,597,064 | 1/1997 | Ozaki et al. | 200/269 |
| 5,753,052 | 5/1998 | Dajoux et al. | |

FOREIGN PATENT DOCUMENTS

| | | |
|---|---|---|
| 428740 | 5/1991 | European Pat. Off. . |
| 571796 | 1/1993 | European Pat. Off. . |
| 2186000 | 5/1987 | United Kingdom . |

OTHER PUBLICATIONS

Int'l Search Report, PCT/US98/06454.
Patent Abstracts of Japan vol. 014, No. 013 (m–918), 11–01–90 & JP 01 258802 A (Tocalo Co. Ltd), 16–10–89.
Database WPI Section Ch, Week 8004 Derwent Pub. Ltd., London, GB; Class M13, An 80–06534C XP002073071 & JP 54 157 389 A (Nippon Tungsten KK).
Patent Abstracts of Japan vol. 013, No. 296 (M–846), 10–07–89 & JP 01 087005 A (Tookaro KK), 31–03–89.
Patent Abstracts of Japan vol. 004, No. 098 (C–018), 15–07–80 & JP 55 058360 A (Satoosen:KK), 01–05–80.
Patent Abstracts of Japan vol. 004, No.111 (M–025), 09*08–80 & JP 55 070453 A (Fujiki Kosan KK), 27–05–80.

*Primary Examiner*—Douglas C. Butler
*Attorney, Agent, or Firm*—Larry J. Palguta; Robert Desmond

[57] ABSTRACT

A drive key (10) for an aircraft wheel comprises a hardened and tempered steel member (10) having improved wear and corrosion resistance. The steel member (10) is coated selectively with a tungsten carbide-cobalt coating (22) to provide wear resistance at side portions (18) where the drive key (10) is engaged by portions of an aircraft brake, and the entire steel member (10) including the tungsten carbide-cobalt coating can be plated with electroless nickel to provide improved corrosion resistance.

17 Claims, 1 Drawing Sheet

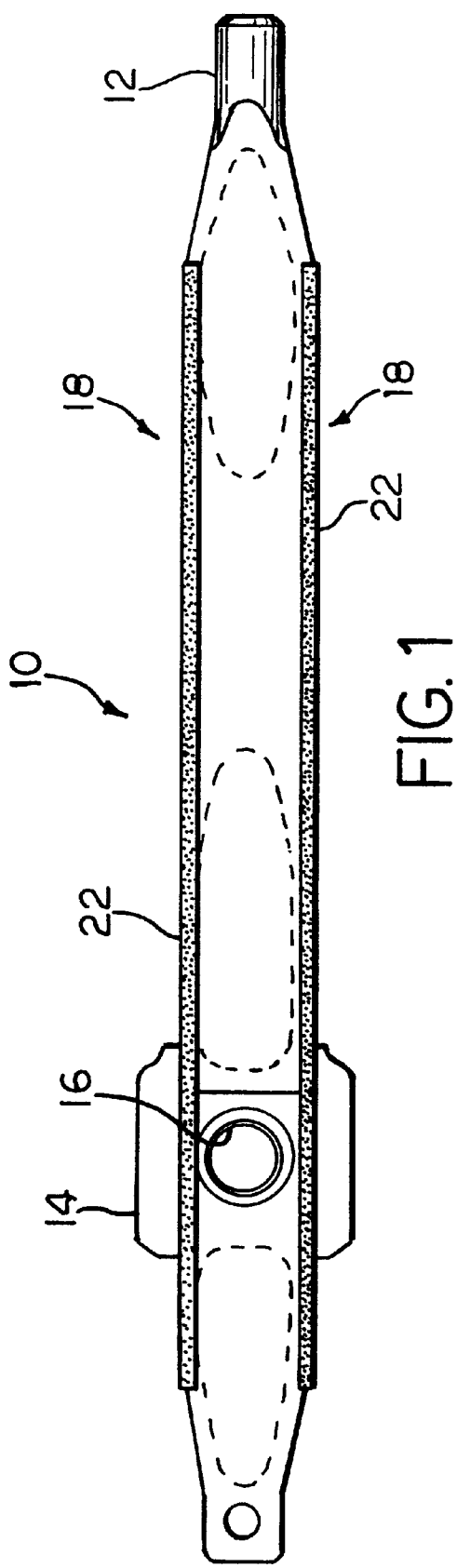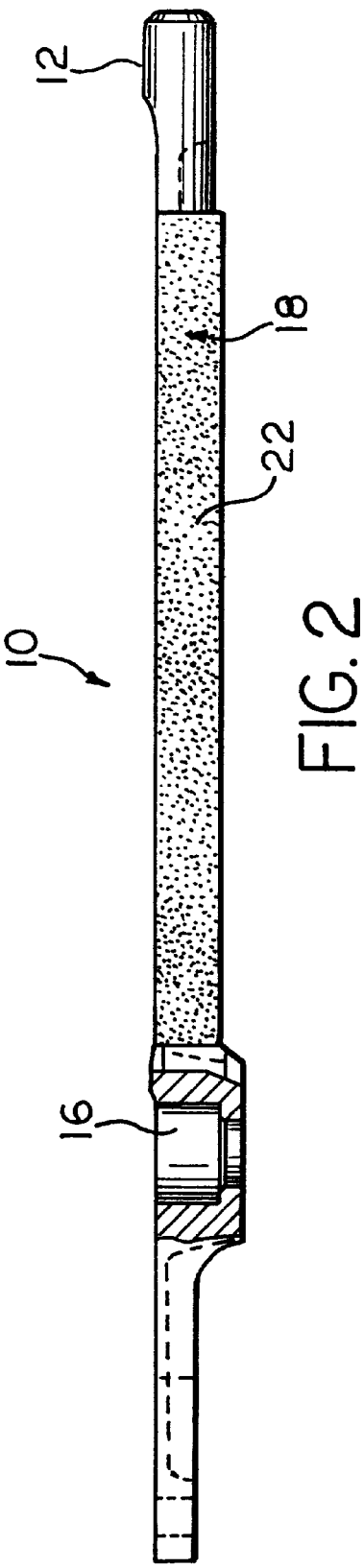

AIRCRAFT WHEEL PART WITH CORROSION AND WEAR RESISTANCE

The present invention relates to a steel member having improved corrosion and wear resistance, and in particular to an aircraft wheel drive key having improved corrosion resistance by means of an electroless nickel plating disposed on the drive key member and tungsten carbide-cobalt coated areas thereof.

Aircraft wheels may include separate drive key members which are attached by bolts to the wheel. The drive key members are engaged by rotors of the aircraft brake. During braking, braking torque must be withstood by the drive keys as the brake rotors are engaged by the brake stators. Typically, the drive key members may be made from hardened and tempered steel to provide a high tensile strength, or a nickel alloy such as Inconel®. Inconel® drive keys have an inherent corrosion resistance, but are significantly more expensive than steel drive keys. Steel drive keys, while costing only a fraction of the cost of Inconel® drive keys, are subject to corrosion which can result in cracking and failures of the steel.

Typically in a steel brake, steel drive key members are coated with a chromium plating which provides sufficient corrosion resistance in that brake environment. However, for aircraft brakes using carbon-carbon composite brake discs, the carbon dust from the brake discs effects a galvanic reaction with the chromium plated steel drive keys such that cleaning agents and de-icers may breach the chromium plating and cause corrosion of the steel member. The subsequent corrosion plus the high stress level of the part results in stress corrosion cracking and finally a failure of the part. It is highly desirable to provide an aircraft wheel steel drive key member which has improved corrosion resistance in order to protect the steel drive key from the effects of carbon dust and prevent both corrosion and the resulting cracking and failure of the part.

The present invention provides solutions to the above by providing a steel member having corrosion resistance, the steel member comprising a hardened and tempered steel member having a high tensile strength, at least one selected portion of said steel member coated with tungsten carbide-cobalt to provide wear resistance, and a coating of electroless nickel coating on the steel member to provide corrosion resistance.

The invention is described in detail below with reference to the drawings which illustrate an aircraft wheel drive key in which:

FIG. 1 is a top view of a typical steel drive key for an aircraft wheel; and

FIG. 2 is a partial cross section of the drive key of FIG. 1.

An aircraft wheel drive key is designated generally by reference numeral 10 in FIGS. 1 and 2. The drive key includes an inboard end extension 12 which is received within a hole at the inboard side of the wheel, and an outboard engagement portion 14 which engages the surface of the wheel and includes a through opening 16 through which extends a bolt which in combination with a nut attaches the drive key to the aircraft wheel. Alternatively, the drive key can be attached to the wheel by means of two openings and bolts and nuts. In an aircraft wheel and brake system, the side portions designated generally by reference numerals 18 are engaged by inserts located at the periphery of rotors of the aircraft brake. The rotors and stators of the aircraft brake are aligned axially along the length of the drive key 10, such that the inserts of the rotors engage the side portions 18.

A drive key made from a nickel alloy such as Inconel® 718 has inherent corrosion resistance but includes a significant cost due to the expense of the material utilized. To improve the wear resistance of Inconel® drive keys, the side portions of the drive keys have been coated with tungsten carbide-cobalt. Such drive keys have been used in aircraft brakes having carbon-carbon composite brake discs which generate carbon dust therefrom.

In steel brakes, that is, state-of-the-art brakes that include steel rotors and stators which include brake linings attached to the stators (or vice versa), steel drive keys are used such as the drive key illustrated in FIGS. 1 and 2. The steel drive keys have previously been plated with chromium in order to provide corrosion resistance. However, when these steel drive keys were subsequently utilized in a carbon aircraft brake, the carbon dust generated from the carbon-carbon composite brake discs caused a galvanic reaction with the steel of the drive key. This occurs because the "throwing" power of a chromium plating system is generally not sufficient to cover the wheel attachment bolt hole or opening 16 (FIGS. 1 and 2) or portions of the attachment flange 14, resulting in the base steel material being exposed to the galvanic reaction from the carbon dust and subsequent corrosion. Because the steel drive key has a high stress level (it is hardened and tempered to 260–300,000 psi ultimate tensile strength), the corrosion results in stress risers at the affected areas with a subsequent cracking followed by finally a failure of the part. Steel drive keys made of H-11 alloy steel cost only a fraction of the cost of Inconel® drive keys, and thus it is highly desirable to provide steel drive keys that can be used in a carbon aircraft brake without subsequent failure caused by the carbon dust generated by the brake.

The present invention provides the desired wear resistance and improved corrosion resistance necessary for a steel drive key to be utilized, without subsequent stress cracking and failure, in a carbon brake having carbon-carbon composite brake discs. Steel drive keys made from H-11 alloy steel forgings are initially cleaned in order to remove dirt, oxides, grease or any other material that cause subsequent coatings or platings not to form on the steel surface. If desired, masking can be applied to the steel drive key in order to apply selectively a tungsten carbide-cobalt coating to a selected area or areas of the drive key. Depending on how the tungsten carbidecobalt coating is applied and according to the size of the area desired to be coated, masking may not be necessary. As shown in FIGS. 1 and 2, the side or lateral areas 18 are covered with a tungsten carbide-cobalt coating 22 which provides the desired wear resistance for the steel drive key. The side portions 18 with the coating 22 will be engaged by drive inserts located about the periphery of the rotors of the carbon brake. The tungsten carbide-cobalt coating may be applied in different forms, such as the two example forms listed below:

| Constituent | Type I | Type II |
| --- | --- | --- |
| Sintered Tungsten Carbide | 88% ± 2% | 80% ± 2% |
| Cobalt | 12% ± 2% | 17% ± 2% |
| Others | 2.5% max | 2.5% max |

The "Others" constituent typically may comprise oxides present from the manufacture of the powder.

The tungsten carbide-cobalt coating is applied by means of a thermal spraying using high velocity oxygen fueled equipment to produce a coating with less than 1% apparent porosity and a bond strength of approximately 10,000 psi minimum. The thickness of the sprayed coating is according to the desired application. Next, the tungsten carbide-cobalt coated drive key 10 is cleaned and prepared, by well known procedures, to prepare it for electroless nickel plating. After cleaning and rinse, the drive key is immersed within an electroless nickel plating solution. After the plating operation, the drive key is rinsed, dried and subsequently heated to effect baking thereof. The baking can be at a low temperature of approximately 375°±25° F. for approximately one day to provide embrittlement relief. It has been found that the electroless nickel plating applies an appropriate plating over the entire part, including the surfaces of the bolt hole 16, and parts of the flange 14 which previously were not fully adequately coated by a chromium plating. Although it is not necessary to provide the electroless nickel coating over the side portions 18 coated previously with tungsten carbide-cobalt, the process is simplified and cost reduced by simply providing an electroless nickel plating over the entire drive key. Subsequently during use, the electroless nickel plating will wear away from the subsisting tungsten carbide-cobalt coating, which is acceptable because the purpose of the tungsten carbide-cobalt coating is to provide wear resistance while the electroless nickel coating plating is provided to provide improved corrosion resistance for areas not coated by tungsten carbide-cobalt. The base metal, H-11 alloy steel, is shielded from corrosive agents by the tungsten carbide-cobalt coating after the electroless nickel plating is worn away. Carbon dust generated by the carbon-carbon composite brake disks of the carbon brake no longer can effect a galvanic reaction with the H-11 steel drive key member because of the integrity of the electroless nickel plating.

The present invention provides a new and novel process and product comprising a steel member which has improved corrosion resistance in an environment which inherently would cause corrosion and subsequent part failure for an inadequately protected member. The tungsten carbide-cobalt coating followed by an electroless nickel plating of the drive key enables the long term use of steel drive keys in carbon aircraft brakes without subsequent corrosion and failures of the drive keys. The steel drive key members provide a significant cost savings in material costs over Inconel® drive keys used in carbon aircraft brakes.

We claim:

1. A steel member having wear and corrosion resistance through a combination of coatings, the steel member comprising a hardened and tempered steel member having a high tensile strength, at least one selected portion of said steel member coated by means of thermal spraying with a tungsten carbide-cobalt composition to provide wear and corrosion resistance, the tungsten carbide-cobalt composition comprising approximately 78–90% sintered tungsten carbide and approximately 10–19% cobalt, and a coating of electroless nickel on the steel member to provide corrosion resistance for the steel member including areas of the steel member that require only corrosion resistance.

2. The steel member in accordance with claim 1, wherein the member includes an opening therein extending to a depth below a surface of said steel member, the electroless nickel coating covers surfaces of said opening.

3. The steel member in accordance with claim 2, wherein said electroless nickel coating covers at least a portion of said tungsten carbide-cobalt coating.

4. The steel member in accordance with claim 1, wherein said electroless nickel coating covers all of said steel member and including the tungsten carbide-cobalt coating.

5. The steel member in accordance with claim 1, wherein said tungsten carbide-cobalt coating covers lateral areas of said steel member.

6. The steel member in accordance with claim 1, wherein said steel member comprises a drive key for an aircraft wheel.

7. The steel member in accordance with claim 6, wherein the drive key includes the tungsten carbide-cobalt coating on side portions thereof, and the electroless nickel coating is disposed over the entire key including the tungsten carbide-cobalt coating.

8. The steel member in accordance with claim 7, wherein the electroless nickel coating may be worn away from a portion of said tungsten carbide-cobalt coating.

9. A process for providing a steel member having corrosion and wear resistance through a combination of coatings, comprising the steps of cleaning a steel member to remove undesirable materials therefrom, thermally spraying the steel member with a tungsten carbide-cobalt composition to provide a coating of tungsten carbide-cobalt, the tungsten carbide-cobalt composition comprising approximately 78–90% sintered tungsten carbide and approximately 10–19% cobalt, cleaning the steel member and tungsten carbide-cobalt coating, and providing an electroless nickel coating on the steel member, whereby the tungsten carbide-cobalt coating provides wear and corrosion resistance and the electroless nickel coating provides corrosion resistance for the steel member including areas of the steel member that require only corrosion resistance.

10. The process in accordance with claim 9, wherein the steel member comprises H-11 steel that is hardened and tempered to provide high tensile strength.

11. The process in accordance with claim 9, wherein the spraying step selectively locates the coating of tungsten carbide-cobalt at a selected area of steel member.

12. The process in accordance with claim 11, wherein the steel member comprises a drive key for an aircraft wheel, and the selected area comprises a portion of the key to be engaged by a portion of an aircraft brake.

13. The process in accordance with claim 12, wherein the selected area comprises lateral portions of the drive key, and the electroless nickel coating is disposed over the entire drive key including the tungsten carbide-cobalt coating.

14. The process in accordance with claim 13, wherein the drive key includes an opening therein which extends to a depth below an outer surface of said drive key, and the electroless nickel coating covers surfaces of said opening.

15. The process in accordance with claim 14, wherein the opening comprises a through hole for receiving therein an attachment member.

16. The process in accordance with claim 15, wherein the electroless nickel coating disposed on the tungsten carbide-cobalt coating may be worn away by the portion of the aircraft brake.

17. A steel member made in accordance with claim 9.

* * * * *